Oct. 19, 1937.  C. H. MILLER  2,096,305
TRIMMER SAW MECHANISM
Filed Feb. 24, 1937  2 Sheets-Sheet 1

Inventor
*Chrest H. Miller*

By *Clarence A. O'Brien*
*Hyman Berman*
Attorneys

Oct. 19, 1937.            C. H. MILLER            2,096,305
                      TRIMMER SAW MECHANISM
                      Filed Feb. 24, 1937           2 Sheets-Sheet 2
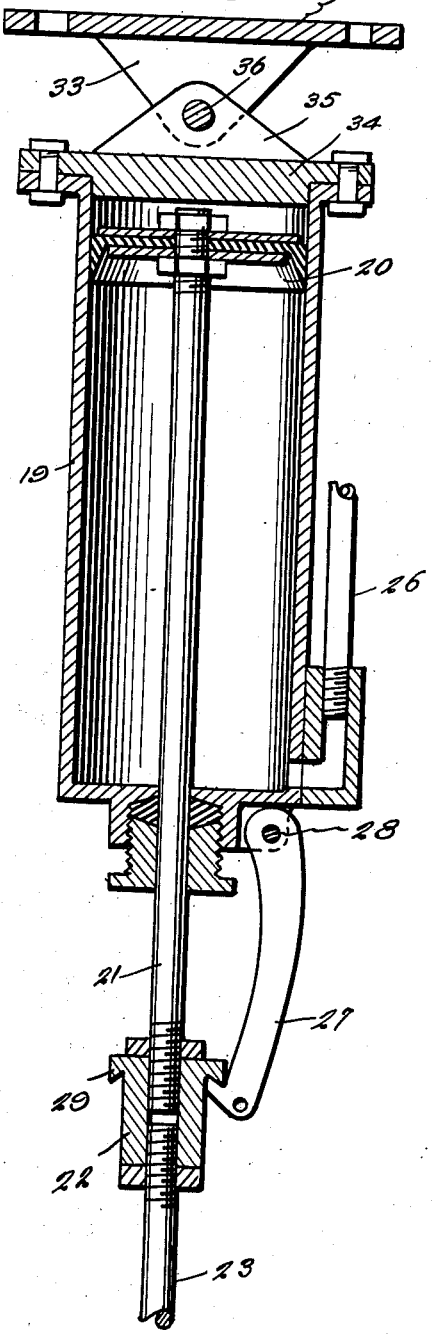
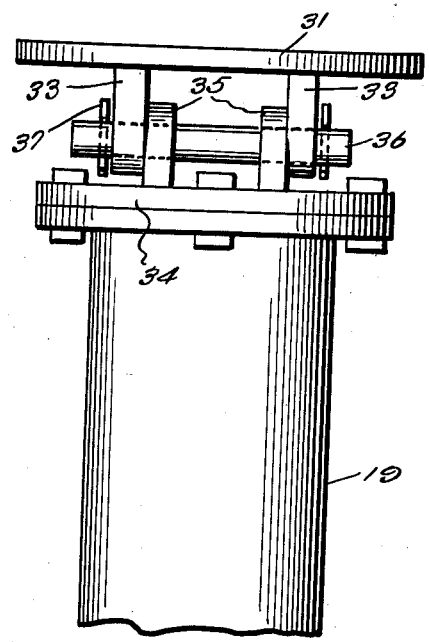
Inventor
Chrest H. Miller
By Clarence A. O'Brien
Hyman Berman
Attorneys Patented Oct. 19, 1937

2,096,305

UNITED STATES PATENT OFFICE 2,096,305

TRIMMER SAW MECHANISM

Chrest H. Miller, St. Helens, Oreg.

Application February 24, 1937, Serial No. 127,466

1 Claim. (Cl. 143—41)

This invention relates to trimmer-saw mechanisms and more particularly to mechanisms of this type characterized by having the saws thereof positioned through the agency of fluid pressure.

At the present time such types of saw trimmer mechanisms have the pressure cylinders suspended rigidly from overhead beams and the pistons working within the cylinders have the rods thereof pivotally connected with rods which are in turn pivotally connected to the outer ends of the arms or radius bars, on which latter the shafts of the respective saws are mounted.

At the present time the connection between the respective connecting rods and the piston rods are such as to be a constant source of annoyance requiring constant repair or replacement.

In accordance with the present invention means is provided whereby the pressure cylinders instead of being rigidly suspended from the overhead beam are pivotally suspended therefrom thereby dispensing with the pivotal connection between the operating rods and the piston rods with the result that the mechanism will operate more efficiently than heretofore.

The invention together with its objects and advantages will be best understood from a study of the following description taken in connection with the accompanying drawings wherein:—

Figure 2 is an enlarged detail sectional view showing the mounting for the pressure cylinder and Figure 3 is an enlarged detail elevational view taken at right angles to Figure 2 and also showing the mounting or suspension means for the pressure cylinder.

Figure 1:
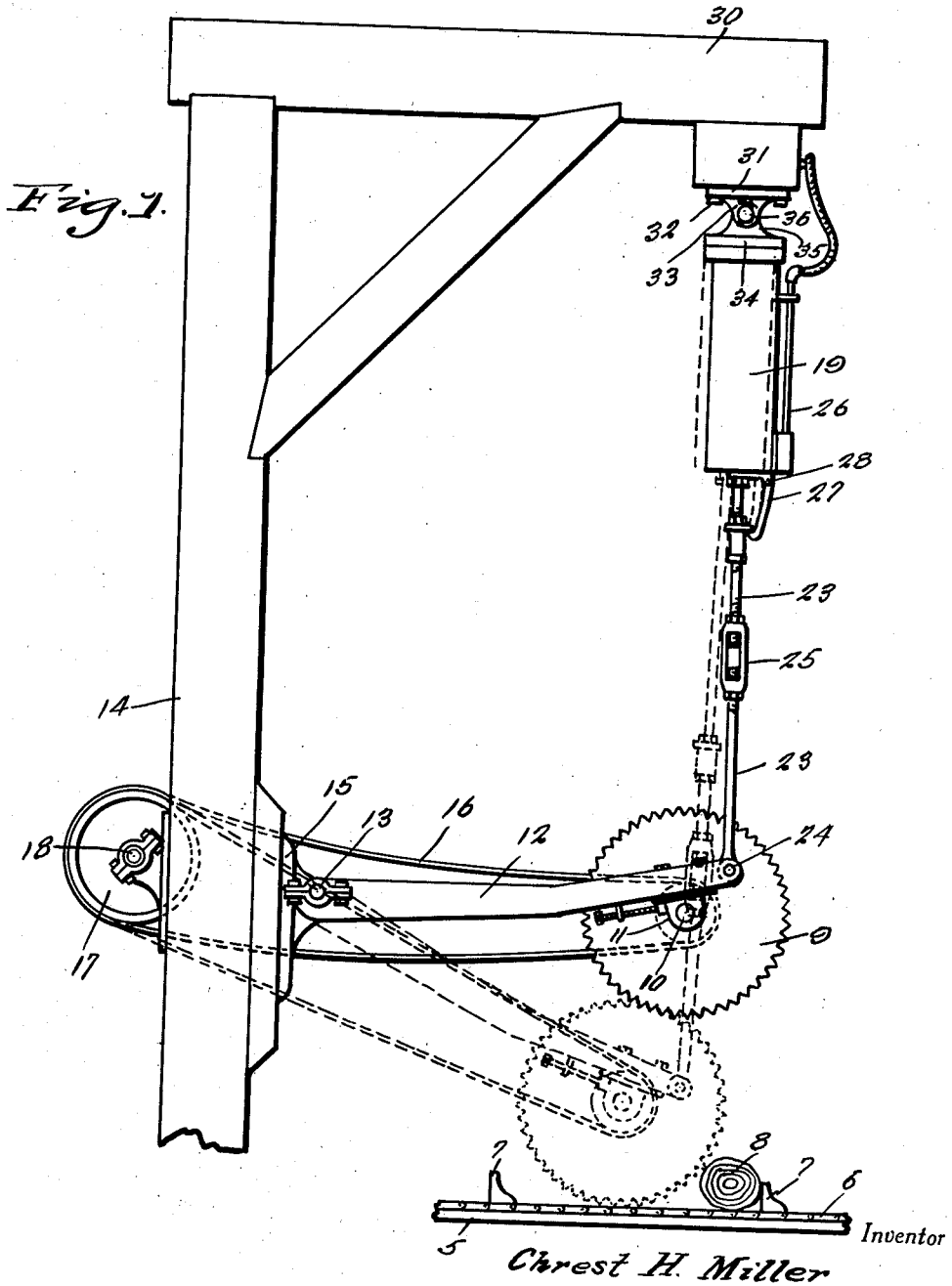
Figure 1 is an enlarged fragmentary side elevational view of a trimmer saw mechanism illustrating the application of the invention thereto.

As is well known, lumber as it comes from the mill, and after having been passed through an edger, is usually placed upon the table 5 of the trimmer and fed over the table so as to be acted upon by the saws which cut the lumber into pieces of any desired length. The saws of such trimmer are so spaced as to cut the lumber into various lengths and means is provided whereby any one or more of the series of saws may be moved toward the lumber so as to cut it into the desired length or lengths.

In the present instance I have shown but a single saw assembly and only so much of that assembly will be specifically referred to as will be necessary for a complete understanding of the invention.

Thus referring more in detail to Figure 1 it will be seen that 5 indicates the table, 6 indicates one of a plurality of chains having lugs 7 thereon which engage the lumber 8 and moves it forwardly along the table beneath the saw 9.

As is conventional the shaft 10 of the saw is mounted in a bearing 11 adjustably mounted upon the free end of an arm or radius bar 12, pivoted as at 13 to the lower portion of a frame 14 or to a bracket 15 mounted on the frame.

The saw is driven by a band 16 which is trained over a pulley 17, mounted upon a common drive shaft 18.

The pressure cylinder for raising and lowering the saw is indicated by the reference numeral 19 while the piston working within the cylinder 19 is indicated by the reference numeral 20. The piston 20 is provided with the usual piston rod 21 to which is coupled through the medium of a coupling sleeve 22 one end of a rod or link 23 the other end of which is pivoted as at 24 to the arm or radius bar 12. In the present instance the rod 23 is shown as consisting of a pair of sections connected together through the medium of a turn buckle 25 whereby the rod may be lengthened or shortened as requirement may demand. Fluid under pressure is supplied to the lower end of the cylinder 19 for raising the piston 20 through the medium of a conduit 26 leading from a suitable source of supply.

For releasably retaining the piston 24 and saw 9 in raised position there is provided the usual mechanical catch 27 pivoted at one end to the lower end of the cylinder 19 as at 28 and cooperable with the flange 29 provided on the upper end of the coupling sleeve 22 as shown in Figure 2.

The structure thus far defined is conventional to certain well known types of lumber trimmers and forms no part of the present invention.

The present invention is concerned primarily with the manner of suspending the pressure cylinder from the arm or overhead beam 30 of the frame 14. Thus, in accordance with the present invention there is provided an attaching plate 31 which is suitably apertured for accommodating screws or other fastening elements 32 through the medium of which the plate 31 is secured to the overhead beam or arm 30.

Depending from the plate 31 are a pair of integral apertured lugs 33.

Also in accordance with the present invention the cap 34 for the cylinder 19 is provided with a pair of spaced apertured lugs 35 which accommodate a pivot pin 36 passing through the apertures in the lugs 35 and the apertures in the lugs 33 for pivotally suspending the cylinder 19 from the plate 31.

Adjacent the respective opposite ends thereof pivot pin 13 is suitably apertured to accommodate cotter pins or the like 37 that serve to retain the pin 36 against axial displacement.

From the above, it will be seen that in accordance with the present invention the cylinder 19 is suspended from the overhead beam or arm 30 of the frame 14 so as to swing on a horizontal pivot incidental to a raising or lowering of the radius bar or arm 12 thus relieving the rigid bar 23 of strain while at the same time precluding the necessity of any other but a rigid connection between the rod 23 and the piston rod 21.

The operation of the device is thought to be apparent. When the saws are in "saws up" position as shown in full lines in Figure 1 the logs 8 then pass beneath said saws. With the saws or saw in "saws down" position as shown in dotted lines, however, said saws or saw will cut the logs.

When in up position the saw is lowered by first releasing the catch 27 so that the piston 20 by gravity and under weight of the saw 9 connected therewith will move downwardly, and when in the lower position shown in figure line will operate to cut the log or timber 8. To raise the saw 9 air or fluid under pressure is applied through the conduit 26 to the cylinder beneath the piston 20 causing the piston 20 to move upwardly thus raising the saw 9 to the full line position shown in Figure 1. Obviously as the saw 9 moves downwardly the cylinder 19 and rod 23 will swing to the dotted line position shown in Figure 1 without placing any tension on the rod 23, the pivotal connection between the cap 34 of the cylinder and the plate 31 permitting a free lateral movement of the cylinder 19 and rod 23 so that no strain whatever from a lateral thrust will be placed on the rod 23.

The advantages of an invention of this character will therefore be clearly apparent to those skilled in the art and—

Having thus described my invention, what is claimed as new is:—

In a saw trimmer mechanism the combination with the pressure cylinder and rod equipped piston working therein, a pivoted radius bar, a saw having a shaft journaled in the free end of said bar and a connecting rod pivoted to the free end of the radius bar, of a rigid connection between said rod and the rod of said piston, and means for pivotally suspending the cylinder at the upper end thereof whereby said cylinder and rod are free to swing laterally incidental to a raising and lowering of the saw, said means comprising a fixedly mounted overhead plate having depending eyes, a plate secured to the top of the cylinder and having upstanding eyes registering with said first-named eyes and a pivot pin inserted in said eyes.

CHREST H. MILLER.